United States Patent
Cho et al.

(10) Patent No.: US 10,498,776 B2
(45) Date of Patent: Dec. 3, 2019

(54) USER TERMINAL APPARATUS AND METHOD FOR COMMUNICATION USING THE SAME

(71) Applicant: SAMSUNG ELECTRONICS CO., LTD., Suwon-si (KR)

(72) Inventors: Hyung-rae Cho, Seoul (KR); Ji-hyeon Kweon, Yongin-si (KR); Kang-min Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 13/960,276

(22) Filed: Aug. 6, 2013

(65) Prior Publication Data

US 2014/0040469 A1     Feb. 6, 2014

(30) Foreign Application Priority Data

Aug. 6, 2012 (KR) .................. 10-2012-0085931

(51) Int. Cl.
| | | |
|---|---|---|
| H04L 29/06 | (2006.01) | |
| H04L 29/08 | (2006.01) | |
| H04W 4/20 | (2018.01) | |

(52) U.S. Cl.
CPC .......... *H04L 65/40* (2013.01); *H04L 65/1069* (2013.01); *H04L 65/4007* (2013.01); *H04L 67/16* (2013.01); *H04W 4/203* (2013.01)

(58) Field of Classification Search
CPC .......... H04L 29/12122; H04L 61/1547; H04M 1/57; H04M 1/64; H04W 4/02; H04W 4/028
See application file for complete search history.

(56) References Cited

U.S. PATENT DOCUMENTS

| | | | |
|---|---|---|---|
| 7,113,776 B2 | 9/2006 | Minear et al. | |
| 7,599,362 B2 | 10/2009 | Sandell et al. | |
| 9,137,362 B2 | 9/2015 | Salis et al. | |
| 9,344,554 B2 | 5/2016 | Kim et al. | |

(Continued)

FOREIGN PATENT DOCUMENTS

| | | |
|---|---|---|
| CN | 1689299 A | 10/2005 |
| CN | 101014196 A | 8/2007 |

(Continued)

OTHER PUBLICATIONS

International Search Report dated Dec. 23, 2013 issued in International Application No. PCT/KR2013/007079 (PCT/ISA/210).

(Continued)

*Primary Examiner* — Esther B. Henderson
(74) *Attorney, Agent, or Firm* — Sughrue Mion, PLLC

(57) ABSTRACT

A user terminal apparatus and a communication method using the same are provided. A user terminal apparatus includes an inputter configured to receive a request for an access to a second user terminal apparatus; a communicator configured to receive service information including at least one communication service provided in the second user terminal apparatus; a displayer configured to display the service information; and a controller configured to, when at least one of the service information is selected, access the second user terminal apparatus through a communication service corresponding to the selected service information.

13 Claims, 13 Drawing Sheets

(56) References Cited

U.S. PATENT DOCUMENTS

| | | | |
|---|---|---|---|
| 9,374,433 | B2 | 6/2016 | Maeng |
| 9,426,257 | B1* | 8/2016 | Pashkov .................. H04L 67/42 |
| 2001/0055379 | A1 | 12/2001 | Mamiya et al. |
| 2002/0040399 | A1 | 4/2002 | Nagashima |
| 2004/0043763 | A1 | 3/2004 | Minear et al. |
| 2004/0064418 | A1 | 4/2004 | Koster et al. |
| 2006/0190825 | A1* | 8/2006 | Zaag ............................ 715/745 |
| 2007/0121614 | A1 | 5/2007 | Sandell et al. |
| 2007/0159482 | A1* | 7/2007 | Yuan ...................... G06F 3/1204 345/440 |
| 2008/0057960 | A1* | 3/2008 | Lahtiranta et al. ......... 455/435.2 |
| 2008/0263178 | A1* | 10/2008 | Hogue .................... G06F 15/16 709/218 |
| 2009/0033985 | A1* | 2/2009 | Platov ................ H04N 1/00209 358/1.15 |
| 2009/0117936 | A1* | 5/2009 | Maeng .............. H04M 1/72547 455/550.1 |
| 2009/0265422 | A1 | 10/2009 | Park et al. |
| 2010/0099393 | A1* | 4/2010 | Brisebois et al. ............. 455/418 |
| 2010/0124193 | A1 | 5/2010 | Prakash et al. |
| 2010/0283735 | A1 | 11/2010 | Kim et al. |
| 2011/0058666 | A1 | 3/2011 | Salis et al. |
| 2011/0067070 | A1 | 3/2011 | Choi et al. |
| 2011/0106878 | A1* | 5/2011 | Cho ....................... G06Q 30/02 709/203 |
| 2011/0165889 | A1* | 7/2011 | Fiatal et al. ................ 455/456.1 |
| 2011/0228331 | A1* | 9/2011 | Yamada ................ G06F 9/4443 358/1.15 |
| 2012/0075204 | A1* | 3/2012 | Murray ................. G06F 3/0416 345/173 |
| 2013/0012240 | A1* | 1/2013 | Shin ........................... 455/456.5 |
| 2013/0082819 | A1* | 4/2013 | Cotterill ................. G06F 21/35 340/5.51 |
| 2014/0022328 | A1* | 1/2014 | Gechter ................. G06Q 30/06 348/14.02 |
| 2014/0304260 | A1* | 10/2014 | Ulm ........................ G06F 17/30 707/728 |
| 2015/0188623 | A1* | 7/2015 | Angeletti et al. |
| 2016/0239169 | A1 | 8/2016 | Kim et al. |

FOREIGN PATENT DOCUMENTS

| | | |
|---|---|---|
| CN | 101431564 A | 5/2009 |
| CN | 101926137 A | 12/2010 |
| CN | 101931903 A | 12/2010 |
| CN | 101931909 A | 12/2010 |
| CN | 102422547 A | 4/2012 |
| EP | 2375685 A2 | 10/2011 |
| JP | 2009-517903 A | 4/2009 |
| KR | 2000-0054413 A | 9/2000 |
| KR | 10-2010-0117435 A | 11/2010 |
| WO | 2004/071048 A1 | 8/2004 |

OTHER PUBLICATIONS

Written Opinion dated Dec. 23, 2013 issued in International Application No. PCT/KR2013/007079 (PCT/ISA/237).
Office Action (Patent Examination Report) dated Jun. 15, 2016, issued by the Australian Patent Office in counterpart Australian Application No. 2013300320.
Communication dated Mar. 31, 2016, issued by the European Patent Office in counterpart European Application No. 13827634.0.
Communication dated Feb. 22, 2017 issued by the State Intellectual Property Office of P.R. China in counterpart Chinese Patent Application No. 201380046631.0.
Communication dated Oct. 19, 2016, issued by the Australian Patent Office in counterpart Australian Application No. 2013300320.
Communication dated Oct. 19, 2017, from the State Intellectual Property Office of People's Republic of China in counterpart Application No. 201380046631.0.
Communication dated Apr. 24, 2018, issued by the European Patent Office in counterpart European application No. 13 827 634.0.
Communication dated Apr. 24, 2018, issued by the State Intellectual Property Office of P.R. China in counterpart Chinese application No. 201380046631.0.
Communication dated May 9, 2018, issued by the Korean Intellectual Property Office in counterpart Korean application No. 10-2012-0085931.
Office Action dated Oct. 9, 2018 by the State Intellectual Property Office of P.R. China in counterpart Chinsese Patent Application No. 201380046631.0.
Office Action dated Nov. 23, 2018 by the Korean Intellectual Property Office in counterpart Korean Patent Application No. 10-2012-0085931.

* cited by examiner 100-1

USER TERMINAL APPARATUS AND METHOD FOR COMMUNICATION USING THE SAME

CROSS-REFERENCE TO RELATED APPLICATION

This application claims priority from Korean Patent Application No. 2012-0085931, filed on Aug. 6, 2012, in the Korean Intellectual Property Office, the disclosure of which is incorporated herein by reference in its entirety.

BACKGROUND

1. Field

Methods and apparatuses consistent with exemplary embodiments relate to a user terminal apparatus and a method for communication using the same, and more particularly, to a user terminal apparatus configured to expand a communication service available in another user terminal apparatus and a method for communication using the same.

2. Description of the Related Art

Due to recent development of mobile apparatus technologies, a mobile apparatus provides various services such as, for example, an e-mail, file sharing, a voice call, a video call, a short message service (SMS), a social network service (SNS), etc. However, since each service is provided through a different communication medium (or server), a user needs to remember his or her identification (ID) for each service and perform a process for establishing a channel for using a corresponding service.

For example, a user of a mobile apparatus may store a telephone number, an email address, a fax number, an SNS ID, etc. of another user in the user's mobile apparatus. In a related mobile apparatus, when the ID of another user is selected, an application for performing a corresponding service is executed and the user's user terminal is connected with the other user. Thus, in order to perform corresponding service and connect with another user, the user needs to know identification information of the other user for the corresponding service.

However, when the user of the mobile apparatus does not know the ID of the other user for a particular service, it is impossible for the user to connect with the other user through the particular service. In this case, the user has no choice but to ask the other user for the other user's ID information used in the corresponding service.

Thus, the user of the mobile apparatus needs to know or request and store the ID information of the other user for a particular communication service in order to communicate with the other user through the particular communication service, which is complicated and inefficient. In addition, in order to obtain the ID information from the other user, additional communication with the other user is required, which causes inconvenience to the user of the mobile apparatus.

SUMMARY

One or more exemplary embodiments provide a user terminal apparatus capable of expanding various communication services available in another user terminal apparatus connected through a particular identification (ID) and a communication method using the same.

According to an aspect of an exemplary embodiment, a user terminal apparatus includes an inputter configured to receive a request for an access to a second user terminal apparatus; a communicator configured to receive service information including at least one communication service provided in the second user terminal apparatus; a displayer configured to display the service information; and a controller configured to, when at least one of the service information is selected, access the second user terminal apparatus through a communication service corresponding to the selected service information.

The service information may be packaged information including information about at least one function provided by at least one external apparatus connected to the second user terminal apparatus and information on each external apparatus.

The displayer may display a user interface (UI) frame in which the service information is listed, and a size and a format of the UI frame may be determined according to a number of the service information.

The displayer may display a UI frame in which the service information is arranged in a predetermined priority order thereof.

When an identification ID of the second user terminal apparatus is included in the request for access, the communicator may provide a communication route to the second user terminal apparatus using the identification and request the second user terminal apparatus for the service information through the communication route.

According to an aspect of another exemplary embodiment, a user terminal apparatus may include a communicator configured to receive a service information request from second user terminal apparatus; and a controller configured to generate service information about at least one available function in the user terminal apparatus from among at least one function of an external apparatus connected to the user terminal apparatus and to transmit the generated service information to the second user terminal apparatus through the communicator, in response to the service information request.

The controller may search for an activated external apparatus from among the at least one external apparatus, selects at least one available function from among functions provided in the searched external apparatus, and generate the service information based on identification information of the searched external apparatus and information about the selected function.

The controller transmits the service information request to a gateway configured to provide an access a network of the external apparatus, receive the service information from the gateway, and transmits the received service information to the second user terminal apparatus.

According to an aspect of another exemplary embodiment, a communication method using a user terminal apparatus may include receiving a request for an access to a second user terminal apparatus; receiving service information including at least one communication service provided in the second user terminal apparatus; displaying the service information; and when one of the displayed service information is selected, accessing the second user terminal apparatus through a communication service corresponding to the selected service information.

The service information may information about at least one function provided by at least one external apparatus connected to the second user terminal apparatus and identification information about the at least one external apparatus.

The displaying may include displaying the service information in a UI frame, wherein a size and a format are determined according to a number of the service information.

The displaying may display a UI frame in which the service information is arranged in a predetermined priority order thereof.

In the receiving an input, a telephone number of the second user terminal apparatus may be included in the request for an access, and the accessing may include providing a communication route to the second user terminal apparatus using the telephone number, and requests the second user terminal apparatus for the service information through the communication route.

According to an aspect of an exemplary embodiment, a communication method using a user terminal apparatus may include connecting with at least one external apparatus; receiving a service information request from a second user terminal apparatus; generating service information about at least one available function of the at least one external apparatus according to the service information request; and transmitting the generated service information to the second user terminal apparatus.

The generating may include searching for an activated external apparatus selected from at least one external apparatus, selecting an available function from among functions provided in the searched external apparatus, and generating the service information based on identification information of the searched external apparatus and information about the at least one available function thereof.

The transmitting may include transmitting the service information request to a gateway configured to provide an access to a network of the at least one external apparatus; and receiving the service information from the gateway and transmitting the received service information to the second user terminal apparatus.

According to an aspect of an exemplary embodiment, a user terminal apparatus includes a storage configured to store identification information of at least one second user terminal apparatus; a user interface configured to provide at least one communication service available in a second user terminal apparatus based on specific identification information; and a controller configured to perform the at least one communication service when the at least one communication service is selected.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Certain exemplary embodiments are described in higher detail below with reference to the accompanying drawings.

Figure 1:
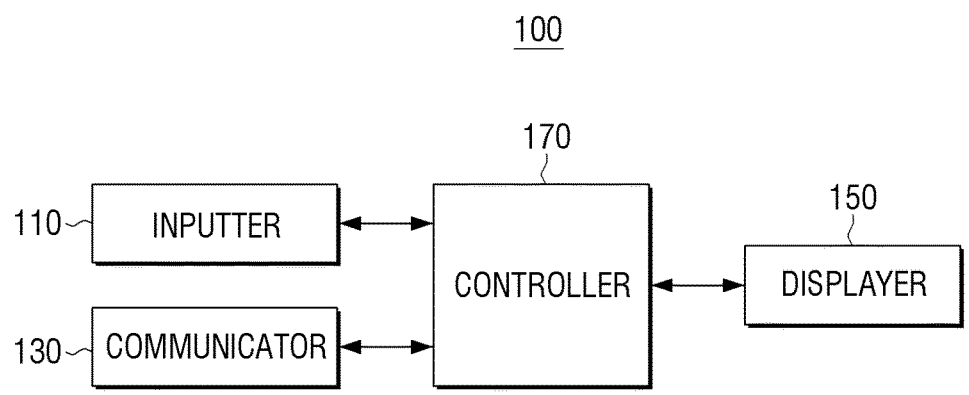
FIG. 1 is a block diagram illustrating a user terminal apparatus according to an exemplary embodiment.

FIG. 1 is a block diagram illustrating a user terminal apparatus according to an exemplary embodiment. With reference to FIG. 1, a user terminal apparatus 100 according to an exemplary embodiment includes an inputter 110, a communicator 130, a displayer 150, and controller 170.

The inputter 110 receives a request an access to another user terminal apparatus (or second user terminal apparatus). The inputter 110 may be integrated and provided with the displayer 150. In this case, the inputter 110 may be provided in various forms such as, for example, an icon, a window, a button, a keypad, etc. displayed on the displayer 150. Alternatively, the inputter 110 may be embodied in a physical button or keypad provided on the user terminal apparatus 100.

For example, in a case where the user terminal apparatus 100 is a smart phone, the inputter 110 may be a number keypad, a character keypad, a symbol keypad, etc. displayed on the displayer 150. When a user touches a corresponding keypad of the displayer 150, the inputter 110 recognizes at least one touch and converts the touch into an input signal. That is, when the user sequentially touches, for example, a telephone number 010-1234-5678, the inputter 110 recognizes each number input on the number keypad and detects the telephone number 010-1234-5678 as an access request signal. Alternatively, when a shortcut button or an icon corresponding to particular information is selected by the user, the inputter 110 detects the selected shortcut button or icon as an access request signal. The inputter 110 may transmit the input access request signal to the controller 170.

The communicator 130 may form a channel for communication with the second user terminal apparatus based on the input access request signal under a control of the controller 170. That is, the communicator 130 may form various forms of communication channels according to types of various communication interfaces provided by the user terminal apparatus 100.

For example, the communicator 130 may access an external apparatus or an external network server by being connected to an internet using various communication methods such as, for example, wired or wireless local area networks (LANs), cellular communication networks, Wifi, Zigbee, etc. To this end, the communicator 130 may include a communication module such as a cellular communication module, a wireless LAN module, a Wifi module, a Zigbee module, a network interface card, etc. The user terminal apparatus 100 may receive service information available to a second user terminal apparatus (not shown) by communicating with the second user terminal apparatus through the communicator 130. Here, the term "service information" refers to communication services available to the second user terminal apparatus. That is, when an access request signal is received from the user terminal apparatus, the second user terminal apparatus may determine whether the second user terminal is connected with an external apparatus, package functional information that the connected external apparatus provides and the service information on each external apparatus, and transmit the packaged information to the user terminal apparatus 100. A detailed explanation thereof will be provided below.

When a telephone number of the second user terminal apparatus is input in response to a request for access input through the inputter 110, the communicator 130 may form a communication route to the second user terminal apparatus by using the input telephone number. That is, the communicator 130 may request searching for whether the second user terminal apparatus having corresponding identification (ID) is accessed by an external server. Here, the input telephone number may be the ID for identifying the second user terminal apparatus. The external server may deliver the access request signal from the user terminal apparatus 100 to the second user terminal apparatus corresponding to the input telephone number.

The communicator 130 according to an exemplary embodiment may transmit an access request signal from the user terminal apparatus 100 to the second user terminal apparatus according to an operation principle of an instant message system.

For example, the user terminal apparatus 100 which attempts to access the external server through the communicator 130 may perform an authentication procedure by using, for example, an ID and/or a password. In order to execute a particular application, the user terminal apparatus 100 may access a network server, request for a session connection, perform the authentication procedure, and perform a session connection when the user terminal apparatus is authenticated. That is, with respect to the user terminal apparatus 100 for which the authentication procedure is completed, a session connection is created with the external server through the communicator 130. When the communicator 130 transmits an access request signal to the external server under the control of the controller 170 of the user terminal apparatus 100 for which a session connection is created, the external server may transmit the access request signal to the second user terminal apparatus identified by the access request signal. When the access request signal is transmitted to the second user terminal apparatus, the second user terminal apparatus may search for an available external apparatus and collect available service information.

The displayer 150 displays the service information received from the second user terminal apparatus. The displayer 150 displays a user interface (UI) frame where service information is listed according to a control by the controller 170. Here, a size and a form of the UI frame may be adjusted according to a number of service information. In addition, the displayer 150 may display a UI frame including service information arranged according to a predetermined priority there.

The displayer 150 may display various screens such as, for example, a background screen, a web browsing screen, an application execution screen, various content reproducing screens for reproducing contents such as, for example, a video and a photograph, and a user interface screen.

The displayer 150 may be embodied in a touch screen capable of sensing a user's touch. Specifically, the displayer 150 may include a display (not shown) and a touch sensor (not shown) provided thereon. The touch sensor may be embodied in a touch sensor capable of sensing a user's touch and a proximate sensor capable of sensing an approach of an object such as a stylus pen or a user's finger, and the display may be embodied in a liquid crystal display (LCD) panel.

The controller 170 communicates with a second user terminal apparatus based on a request signal for accessing the second user terminal input through the inputter 110. The controller 170 forms a UI frame using service information received through the communicator 130. The controller 170 may form a UI frame including, for example, service information configured in various layouts according to the number of service information, a priority of service information, a user setting, etc.

In addition, the controller 170 performs overall control operations of the user terminal apparatus 100, and when one of the service information displayed on the displayer 150 is selected, the controller 170 may control the communicator 130 to access the second user terminal apparatus in an access method corresponding to the selected service information. In an exemplary embodiment, the controller 170 may be a central processor unit (CPU).

The user terminal apparatus 100 according to an exemplary embodiment illustrated in FIG. 1 may receive available service information from the second user terminal apparatus. That is, the user terminal apparatus 100 may access the second user terminal apparatus through ID information, and the user of the user terminal apparatus 100 may create a route for communication with the second user terminal apparatus even in a case where an ID of the second user terminal apparatus for a corresponding service is not known. Therefore, the user terminal apparatus according to an exemplary embodiment may expand a communication route in various communication methods available in the second user terminal apparatus, thereby improving user convenience.

Figure 2:
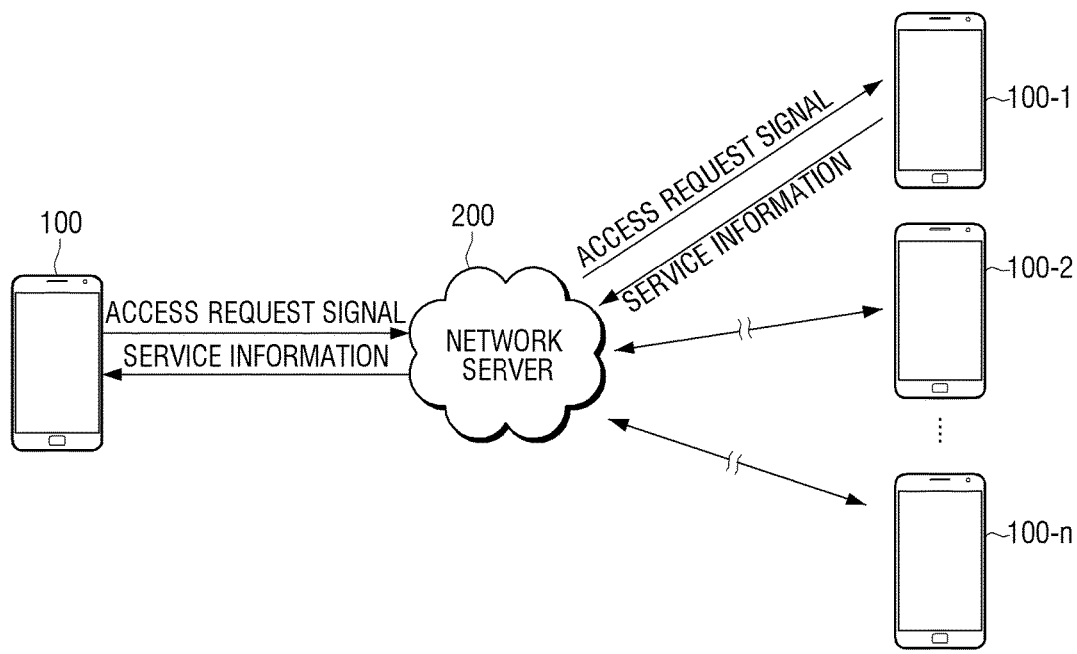
FIG. 2 is a conceptual view for explaining a network communication method between a user terminal apparatus and other user terminal apparatuses according to an exemplary embodiment.

FIG. 2 is a conceptual view for explaining a network communication between a user terminal apparatus and other user terminal apparatuses according an exemplary embodiment.

With reference to FIG. 2, a network may include a user terminal apparatus 100, a network server 200 and a plurality of second user terminal apparatuses 100-1 to 100-*n*.

The user terminal apparatus 100 may establish a communication route with the network server 200 through the communicator 110, and the network server 200 may be connected with a plurality of second user terminal apparatuses 100-1 to 100-*n* in various communication protocols. For example, the network server 200 may be a server which relays an internet network such as a local area network (LAN), a wide area network (WAN), a metropolitan area network (MAN), etc. Alternatively, the network server 200 may be a server configured to relay and manage network connection among a plurality of user terminal apparatuses through Intranet.

For example, the user terminal apparatus 100 may access the network server 200 according to an internet service prescribed by the user. When the user terminal apparatus 100 receives an access request signal, the user terminal apparatus 100 may transmit the input access request signal to the network server 200. The network server 200 may identify a second user terminal apparatus 100-1 corresponding to the access request signal from among internet service subscribers and transmit an access request signal to the identified second user terminal apparatus 100-1.

The second user terminal apparatus 100-1 that receives the access request signal may search for available service information thereof and transmit service information to the network server 200.

The network server 200 transmits the received service information to the user terminal apparatus 100 which transmits the access request signal. The network server 200 may store identification information of the user terminal apparatuses 100, 100-1, 100-2, ... 100-n in a database (not shown). When the network server 200 receives an access request signal for forming a route for communication with a particular user terminal apparatus from among at least one other user terminal apparatus, the network server 200 may identify the particular user terminal apparatus using information included in the corresponding access request signal.

Figure 3:
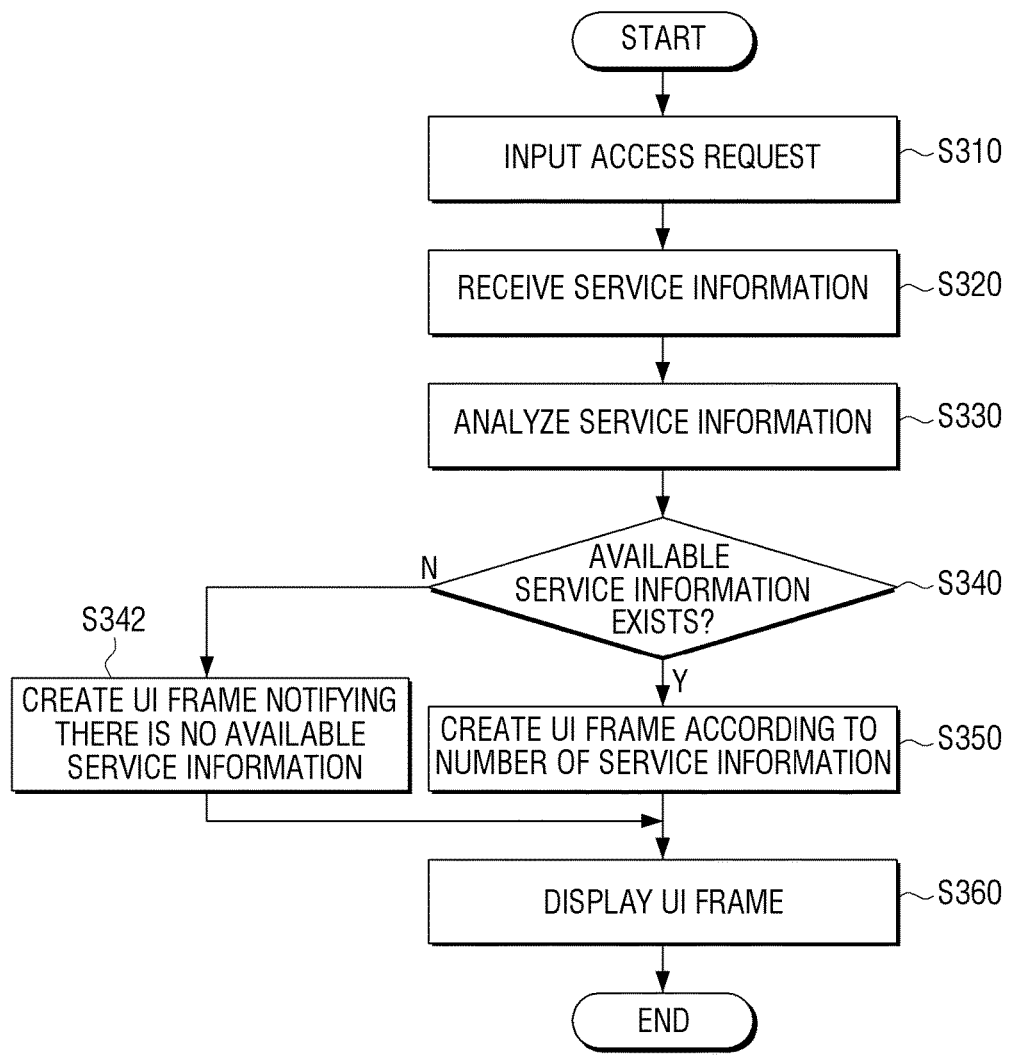
FIG. 3 is a flowchart illustrating a communication method using a user terminal apparatus according to an exemplary embodiment.

FIG. 3 is a flowchart illustrating a communication method using a user terminal apparatus according to an exemplary embodiment.

With reference to FIG. 3, the user terminal apparatus 100 receives an access request from a user for accessing a second user terminal apparatus (S310). The access request may be generated when the user executes a particular application installed in the user terminal apparatus 100 and inputs at least one identification (ID) regarding the second user terminal to be connected in the executed application. For example, when a telephone application is executed in the user terminal apparatus 100 and the user inputs a telephone number corresponding to the second user terminal apparatus by using, for example, a keypad, the user terminal apparatus 100 recognizes the corresponding telephone number as an access request signal and may transmit the corresponding access request signal to the network server 200.

The user terminal apparatus 100 receives service information available in the second user terminal apparatus from the network server 200 (S320). That is, the user terminal apparatus 100 may transmit the access request signal to the second user terminal apparatus through the network server 200. The second user terminal apparatus that receives the access request signal searches for an external apparatus connected thereto and collects available service information to the searched external apparatus. The second user terminal apparatus may transmit the service information collected through the network server 200 to the user terminal apparatus 100.

The user terminal apparatus 100 analyzes the service information transmitted from the second user terminal apparatus according to a communication protocol of the network server 200 (S330). For example, in a case where the user terminal apparatus 100 exchanges packet information with the network server 200 and performs data communication, the user terminal apparatus 100 may receive packet data regarding the available service information of the second user terminal apparatus from the network server 200. The user terminal apparatus 100 may digitalize the received packet data and obtain service information of the second user terminal apparatus to be accessed.

The user terminal apparatus 100 determines whether the obtained service information includes available service information (S340). The user terminal apparatus 100 counts a number of available services in the second user terminal apparatus included in the obtained service information. For example, when the available service information received from the second user terminal apparatus includes a fax, a message, an email, and a social network service (SNS), the user terminal apparatus 100 determines that four services are available ("Yes" to S340).

If there is no available service information included in the service information received from the second user terminal apparatus ("No" to S340), the user terminal 100 may notify through, for example, a UI frame, that there is no available service information (S342).

Alternatively, without notifying, the user terminal apparatus 100 may execute the corresponding application using identification (ID) in the access request input. For example, when the user terminal apparatus 100 inputs a telephone number as an access request signal, the user terminal apparatus 100 may use the input telephone number to execute the telephone application to place a telephone call to another user. Here, the telephone connecting method may include a wireless telephone connecting method used in related art cellular phones.

When the user terminal apparatus 100 determines that there is available service information ("Yes" to S340), the user terminal apparatus 100 analyzes the available service information from the received service information and creates a UI frame according to the number of available services based on the analyzed result (S350). For example, when the number of available services is two, the user terminal apparatus 100 may create two icons and create a UI frame including the two icons. A UI frame may be created such that, for example, two substantially bar shaped icons are arranged next to each other. Alternatively, a UI frame may be created such that two icons having substantially square shapes are arranged in left and directions. Alternatively, a UI frame may be created such that two icons having substantially circular frames are arranged in up and down directions.

When the number of available services increases, UI frames having various forms may be further created according to the number of increased available services.

The user terminal apparatus 100 displays the created UI frame on a predetermined area of the screen (S360). For example, the user terminal apparatus 100 may display the created UI frame on various locations such as, for example, a middle portion of the screen, a lower portion of the screen, an upper portion of the screen, a left portion of the screen, or a right portion of the screen.

A communication method using a user terminal apparatus according to an exemplary embodiment illustrated in FIG. 3 may have an effect of expanding various communication services available in the second user terminal apparatus. That is, in the communication method according to an exemplary embodiment, by using only one ID regarding the second user terminal apparatus, it is possible to obtain various communication services available in the second user terminal apparatus and transmit and receive the available service information in various ways, thereby achieving an effect of expanding the communication services.

The communication method illustrated in FIG. 3 may be applied to the user terminal apparatus 100 illustrated in FIG. 1. Additionally, the communication method illustrated in FIG. 3 may also be applied to any apparatus performing similar functions to those of the user terminal apparatus 100 illustrated in FIG. 1

Figure 4:
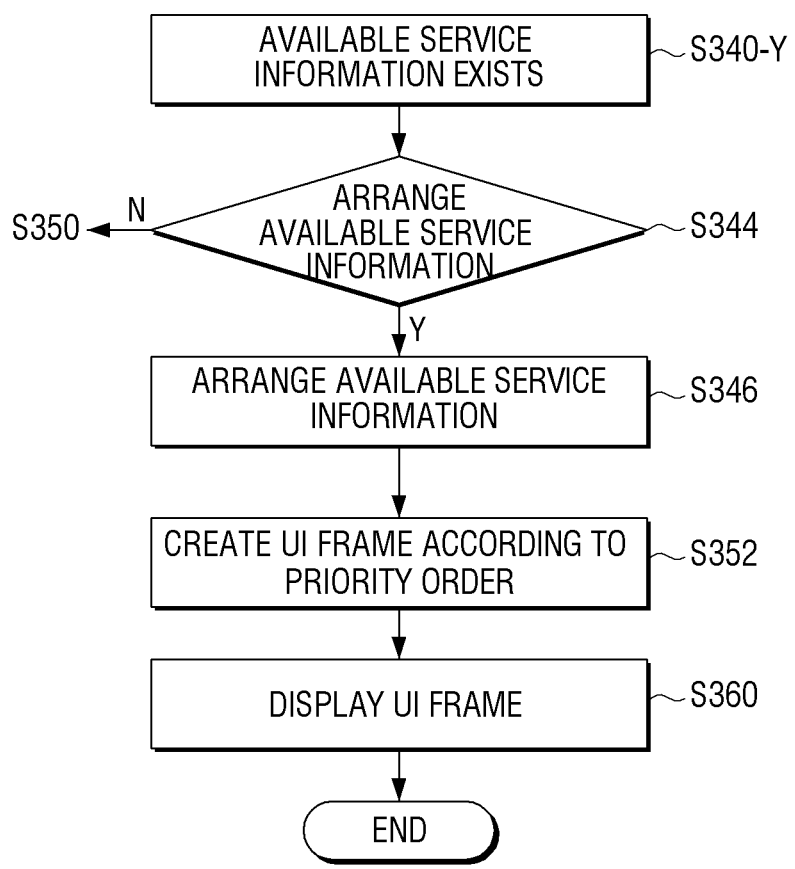
FIG. 4 is a detailed flowchart illustrating a communication method using a user terminal apparatus according to an exemplary embodiment.

FIG. 4 is a detailed flowchart illustrating a communication method using a user terminal apparatus according to an exemplary embodiment.

With reference to FIG. 4, when it is determined that there is available service information in FIG. 3 ('Yes' to S340), it is determined whether there is any criteria for arranging the available service information (S344).

If it is determined that there is no criteria for arranging the available service information ('No' to S344), the method proceeds to operation S350 in which a UI frame is created according to the number of available services (S350).

If it is determined that there is a criteria for arranging the available service information ('Yes' to S344), the available service information is arranged according to the arrangement criteria (S346). For example, in a case where the available service is an email, a telephone, and a fax and the second user terminal apparatus uses an email most frequently and uses a fax least frequently, a priority among the available service information may be determined in an order of an email, a telephone, and a fax.

Alternatively, in a case where the second user terminal apparatus presets a priority order among the available service information such as, for example, in an order of a fax, a telephone, and an email, the priority of the available service information may be arranged in the preset priority order of a fax, a telephone, and an email, as named.

The user terminal apparatus 100 may create a UI frame to be arranged according to a priority order (S352). That is, the UI frame may be created such that service information having a top priority is arranged in a leftmost side of the UI frame and other service information having a lower priority is arranged to a right side of the UI frame. For example, the UI frame may be configured such that service information of a higher priority is arranged in a left side of the UI frame compared to service information of a lower priority. Alternatively, it is possible to arrange the UI frame such that an icon capable of executing service information having the top priority to correspond to a bigger size area of the UI frame. Similarly, icons may be arranged to have a size corresponding to a priority of the service information that can be executed by the icons, respectively.

The user terminal apparatus 100 displays the created UI frame (S360). For example, the created UI frame may be displayed on at least one of a left side, a right side, an upper side, and a lower side of the screen. A location or a size of the area of the screen where the UI frame is to be displayed may be adjusted by the user. Alternatively, when the UI frame is displayed on the screen, the user may freely adjust the location of the displayed UI frame.

Figure 5:
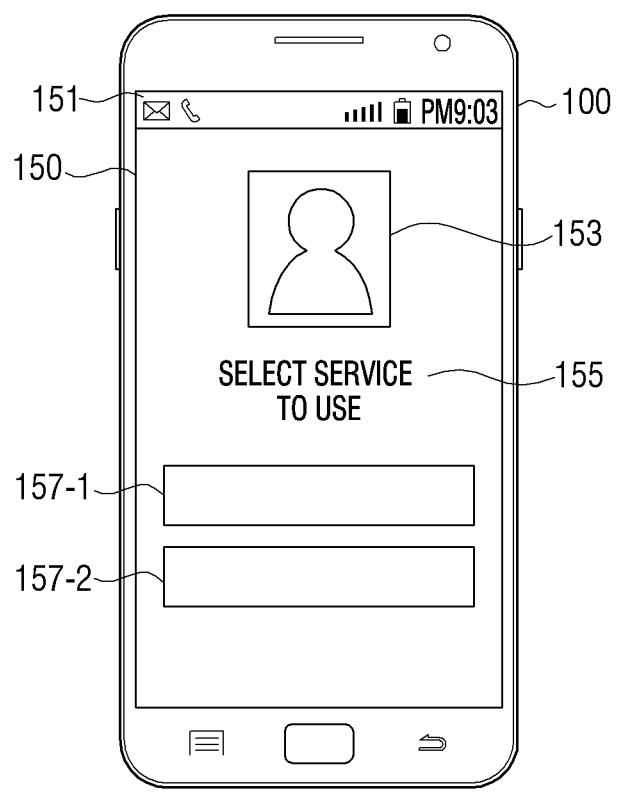
FIG. 5 is a view for explaining an example of displaying a user interface (UI) frame in a case where two service information is available in a second user terminal apparatus according to an exemplary embodiment.

FIG. 5 is a view for explaining an example of displaying a UI frame in a case where there is two available service information of the user terminal apparatus according to an exemplary embodiment.

With reference to FIG. 5, on the displayer 150 of the user terminal apparatus 100, a status bar image 151, a second user image 153, a notice message image 155, and service information UI frames 157-1, 157-2 are shown.

For example, the user terminal apparatus 100 receives packaging information of service information from the second user terminal apparatus. The user terminal apparatus 100 analyzes the received packaging information and determines whether there is available service information, and when available service information exists, the user terminal apparatus 100 creates a notice message which reads, for example, "select service to use". Also, the user terminal apparatus 100 determines the number of available service information and may create a UI frame for displaying at least one available service information according to the number of service information.

The user terminal apparatus 100 may display the status bar image 151 configured to display an overall status of the user terminal apparatus 100, a second user image 153 corresponding to a user of the second user terminal apparatus, a notice message image 155 notifying that there is available service information in the second user terminal apparatus, and UI frames 157-1, 157-2 representing available service information on the displayer 150 in a predetermined layout form.

When the user terminal apparatus 100 is, for example, a mobile phone or a smart phone, the status bar image 151 may be an image showing time, a remaining battery volume, a state of receiving sensitivity, a receiving state of text messages, and a state of call, etc. Thus, the status bar image 151 may display various information showing the overall status of the user terminal apparatus.

The second user image 153 may be at least one of an image, a character, an animation, and an avatar corresponding to the user of the second user terminal apparatus. The second user image 153 may be predetermined by the user of the user terminal apparatus 100 to identify the user of the second user terminal apparatus. That is, an image may be preset as the second user image 153 and prestored in the user terminal apparatus 100. The second user image 153 preset as described above may be displayed on the displayer 150 when a route for communication with the second user terminal apparatus is formed.

The notice message image 155 is an image for notifying the user of the user terminal apparatus 100 when there is one or more available service information in the second user terminal apparatus. Also, the notice message image 155 may notify when the user may select the service information to be used.

When there are two service information, a first UI frame 157-1 representing first service information is created and displayed, and a second UI frame 157-2 representing second service information is created and displayed. Here, the first UI frame 157-1 and second UI frame 157-2 may have a substantially rectangular bar shape. That is, the first UI frame 157-1 and second UI frame 157-2 may be bar shaped icons displaying the available service information in the second user terminal apparatus. When the user selects an icon, a service application corresponding to service information represented by the selected icon may be executed.

Figure 6:
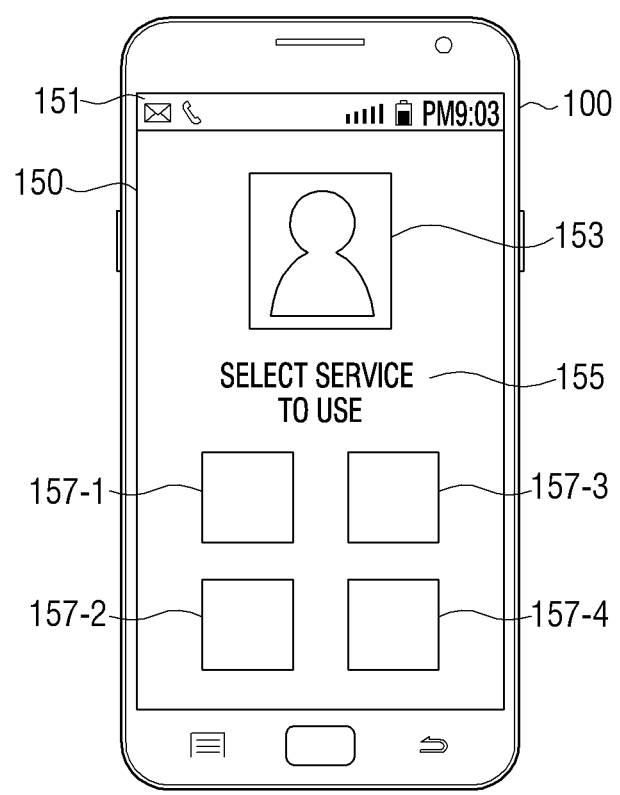
FIG. 6 is a view for explaining an example of displaying a UI frame in a case where four service information is available in a second user terminal apparatus according to an exemplary embodiment.

FIG. 6 is a view for explaining an example of displaying a UI frame when there is four available service information of the user terminal apparatus according to an exemplary embodiment.

With reference to FIG. 6, a status bar image 151, a second user image 153, and a notice message image 155 are displayed, similar to the exemplary embodiment of FIG. 6. Hence, a detailed explanation thereof is omitted.

When there are four service information, four UI frames respectively representing the four service information are created and displayed. That is, a first UI frame 157-1 representing first service information, a second UI frame 157-2 representing second service information, a third service information representing third UI frame 157-3, and a fourth UI frame 157-4 representing fourth service information may be created and displayed.

Here, the first to fourth UI frames 157-1 to 157-4 may have substantially square shapes. The first to fourth UI frames 157-1 to 157-4 may be icons each representing available service information in the second user terminal apparatus, and when the user of the user terminal apparatus 100 selects an icon, a service application corresponding to service information corresponding to the selected icon may be executed.

The UI frames illustrated in FIG. 6 are shown as substantially the same size square shaped icons. However, it should be noted that the shape of the UI frame may be in various forms such as, for example, a triangular, square, oval, circular, or polygonal shape. Also, although it is described that a plurality of UI frames 157-1 to 157-4 are arranged in a 2×2 matrix format in FIG. 6, it should be noted that the plurality of UI frames 157-1 to 157-4 may also be arranged in various formats such as, for example, a 1×4 matrix format, in a row, or in a round table.

Figure 7:
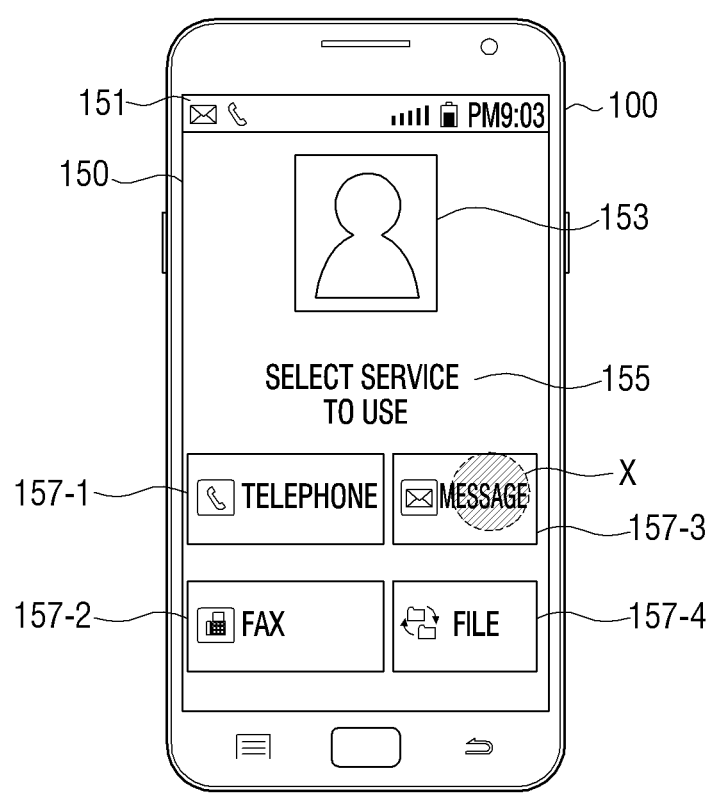
FIG. 7 is a view for explaining an example of displaying a UI frame created by arranging service information available in a second user terminal apparatus according to an exemplary embodiment.

FIG. 7 is a view for explaining an example of displaying a UI frame created by arranging the available service information of the user terminal apparatus according to an exemplary embodiment.

With reference to FIG. 7, similar to the exemplary embodiment of FIG. 5, a status bar image 151, a second user image 153, and a notice message image 155 are displayed. Hence, a detailed explanation thereof is omitted.

Here, a plurality of UI frames 157-1 to 157-4 are arranged and displayed according to a priority order, as will be described in detail below.

When the user terminal apparatus 100 obtains four service information about four services which are available in the second user terminal apparatus, the user terminal apparatus 100 may arrange the four service information obtained as aforementioned according to predetermined conditions.

A method for arranging the plurality of service information according to the predetermined conditions is explained in further detail below.

First, the user terminal apparatus 100 analyzes the available service information from among the received service information and determines a priority order of the corresponding available service information based on a predetermined criteria. For example, when the available service information in the second user terminal apparatus is a telephone, a short messaging service (SMS), a fax, and file transmission, the user terminal apparatus 100 may determine service information that the user uses most often as a top priority service, and determine the service information that the user uses least often as a lowest priority service. That is, for example, when the user of the user terminal apparatus 100 uses a telephone the most often, the user terminal apparatus 100 may determine the telephone service information as the top priority service information. A use frequency may be analyzed based on history information on the number of execution of the application in the user terminal apparatus 100.

Alternatively, the user terminal apparatus 100 may receive information on the user's use frequency with respect to each available service information from the second user terminal apparatus together with the available service information. That is, when it is determined that a use frequency of a short messaging service (SMS) is highest, followed by a use frequency of a telephone, a use frequency of file transmission, and a use frequency of a fax, in an order as named, it is possible to arrange the plurality of service information according to the order of the use frequencies thereof.

Alternatively, the user terminal apparatus 100 may determine the priority order of the plurality of service information according to the state of communication. For example, when the user terminal apparatus 100 uses Wifi, a higher priority may be given to service information which needs to be accessed using Wifi, and a lower priority may be given to service information which cannot be accessed using Wifi.

In a case where the user terminal apparatus 100 cannot use Wifi but may instead use a third generation (3G) network, a higher priority may be given to service information which needs to be accessed using the 3G network and a lower priority may be given to service information which cannot be accessed using the 3G network.

Alternatively, the user terminal apparatus 100 may determine the priority order of a plurality of service information according to a predetermined user setting. For example, in a case where the user decides a service provided through messages as a top priority and the second user terminal apparatus may use a service through messages, the top priority is given to the service through messages. The user may determine priority orders of a plurality of service information in advance, and the UI frames corresponding to service information may be arranged according to the priority orders thereof.

FIG. 7 illustrates four service information displayed through four UI frames 157-1 to 157-4. When the user of the user terminal apparatus 100 generates a gesture of selecting, for example, a message service (X) shown on the UI frame 157-3 from among four UI frames, an application executing the corresponding message service may be executed separately or together with an integrated communication application.

A detailed explanation of selecting a message service by the user will be provided below.

Figure 8:
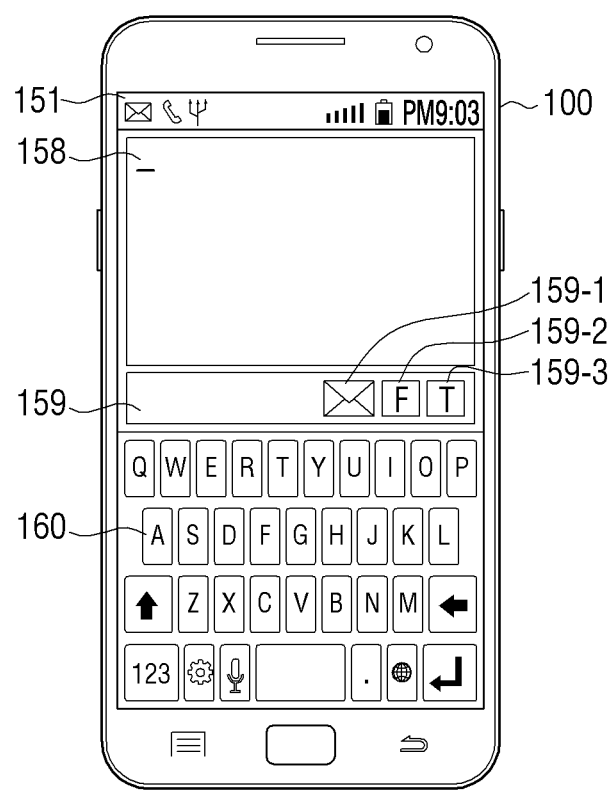
FIG. 8 is a view for explaining an exemplary of displaying a subset UI frame of a message service in a case where the message service is selected in FIG. 7.

FIG. 8 is a view for explaining an example of displaying a subset UI frame of a message service when the message service is selected in FIG. 7.

With reference to FIG. 8, the displayer 150 may display a state bar image 151, a message display area 158, a UI frame set 159 including sub UI frames 159-1, 159-2, 159-3, and a keypad 160.

Message contents are displayed on the message display area 158 of the displayer 150. The user may input a message through the keypad 160 and the input message may be displayed on the message display area 158.

The sub UI frame set 159 may include a first UI sub frame 159-1 indicating an SMS function, a second UI sub frame 159-2 indicating a first SNS service (e.g., Facebook), and a third UI sub frame 159-3 indicating a second SNS service (e.g., Twitter).

When the first UI sub frame 159-1 is executed, an SMS application is executed and an SMS application execution screen is displayed on the message display area 158. When the user of the user terminal apparatus 100 completes writing an SMS message and inputs a transmission command, the user terminal apparatus 100 may transmit the SMS message to the network server 200, and the network server 200 may transmit the corresponding SMS message to a second user terminal apparatus identified by an input telephone number.

When the user of the user terminal apparatus 100 executes the second UI sub frame 159-2 in order to execute the first SNS service, an application for executing the first SNS service may be executed, and the user may send the message contents displayed on the message display area 158 to a specific user or share the message contents with other users through the first SNS service. When the second UI sub frame 159-2 is executed, similar to executing the first SNS service, it is possible for the user to input a message on the message display area 158 and transmit the input message through the second SNS service without directly accessing the corresponding second SNS service. The input message may be transmitted to a second SNS service server through the network server 200, and the second SNS service server may store corresponding message data in a database for the user of the second user terminal apparatus identified by, for example, the input telephone number and display the corresponding message on a second SNS application execution screen of the second user terminal apparatus.

The user terminal apparatus 100 according to an exemplary embodiment may form a route for communication with the second user terminal apparatus based on the one identification information of the second user terminal apparatus, and when available service information is received from the second user terminal apparatus based on the formed communication route, the user terminal apparatus 100 may communicate with the second user terminal apparatus through at least one available service. Thus, it is possible to achieve an effect of expanding various services available in the second user terminal through a communication route without performing an additional accessing or authentication process to use corresponding service information.

A process in which the available service information in the second user terminal apparatus is transmitted to the user terminal apparatus 100 is explained in more detail below.

Figure 9:
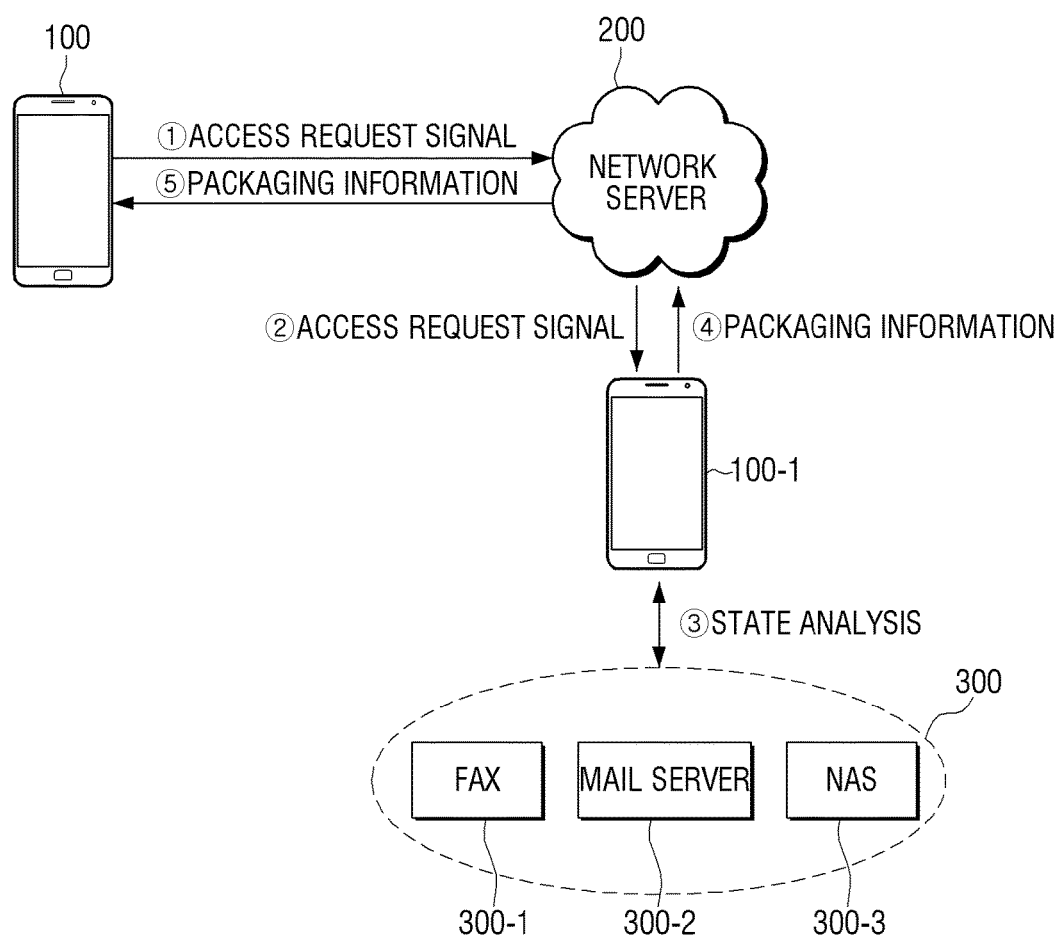
FIG. 9 is a conceptual view illustrating a user terminal apparatus which receives packaging information including service information from a second user terminal apparatus according to an exemplary embodiment.

FIG. 9 is a conceptual view illustrating a user terminal apparatus which receives packaging information including service information from a second user terminal apparatus according to an exemplary embodiment.

With reference to FIG. 9, when a first user terminal apparatus 100 and a network server 200 are connected, the user of the first user terminal apparatus 100 transmits a request signal for accessing a second user terminal apparatus 100-1 to the network server 200. The network server 200 analyzes identification information of the second user terminal apparatus 100-1 included in the access request signal from the first user terminal apparatus 100 and searches for the second user terminal apparatus 100-1 based on the analyzed identification information. When the network server 200 cannot locate the second user terminal apparatus 100-1, the network server 200 may transmit a message that the second user terminal apparatus 100-1 is not connected to the first user terminal apparatus 100.

When the network server 200 locates the second user terminal apparatus 100-1, the network server 200 may perform a session connection with the second user terminal apparatus 100-1 and transmit the access request signal from the first user terminal apparatus 100 to the second user terminal apparatus 100-1.

The second user terminal apparatus 100-1 which receives the access request signal analyzes its connection state with an external apparatus 300. Here, the second user terminal apparatus 100-1 may perform a home gateway function. That is, the second user terminal apparatus 100-1 may analyze its wired or wireless connection state of the external apparatus 300 such as, for example, a fax 300-1, a mail server 300-2, and a network access server (NAS) 300-3.

Here, the fax 300-1 may perform a wired or wireless communication interface with the second user terminal apparatus 100-1, and the second user terminal apparatus 100-1 may perform a gateway role between the network server 200 and the fax 300-1.

The mail server 300-2 may be a mail server exclusively provided for the second user terminal apparatus 100-1 or may be a general mail server provided by the internet service provider (ISP). Also, when an intranet network is provided, the main server 300-2 may be a server which manages mails of a plurality of user terminal apparatuses connected by the intranet.

The NAS 300-3 may be a computer server of the internet service provider (ISP) which performs interface functions and log-in checking functions of communication service providers and internet backbones. The user of the second user terminal apparatus 100-1 may input a user name and a password to perform an authentication procedure to the NAS 300-3, and the second user terminal apparatus 100-1 authenticated by the NAS 300-3 may initiate communication with other computers connected through the internet.

The NAS 300-3 may be configured to perform both fax and mail server functions. That is, the NAS 300-3 may be a type of internet network server that may provide services such as voice over internet protocol (VoIP), a fax, an over-internet protocol (IP), and a voice mail over-IP.

The VoIP provides a voice service which is provided through a general telephone.

In the VoIP, the voice service, which is provided through public switched telephone network (PSTN) in the related art, is provided using the internet protocol technologies. That is, as a voice is digitalized and internet protocols (IPs) are used as transmission systems, an improved internet telephony service is possible using, for example, an internet fax, a web call, and an integrated message processing as well as a telephone. Such VoIP technologies may be applied to not only the Internet but also private IP base networks, PSTN or combination networks thereof.

The second user terminal apparatus 100-1 may, based on the state analysis of the connected external apparatus 300, create packaging information including available service information according to the result of the state analysis and transmit the created packaging information to the network server 200.

The network server 200 may transmit the packaging information including the available service information received from the second user terminal apparatus 100-1 to the first user terminal apparatus 100.

The first user terminal apparatus 100 may receive the packaging information including the available service information of the second user terminal apparatus 100-1 corresponding to the access request signal from the network server 200.

In the above, it is described that the access request signal is transmitted to the server 200 by the first user terminal apparatus 100 and that the second user terminal apparatus 100-1 analyzes the state of connection with the external apparatus 300 in response to the access request signal transmitted through the network server 200. However, it should be noted that, even when the access request signal is not received, the second user terminal apparatus 100-1 may check the state of connection with the external apparatus 300 at every predetermined period or may check the state of connection with the external apparatus at a user's command.

A process where the second user terminal apparatus 100-1 scans the external apparatus and creates state information as packaging information in response to the access request signal transmitted from the first user terminal apparatus 100 through the network server 200 will be described below.

Figure 10:
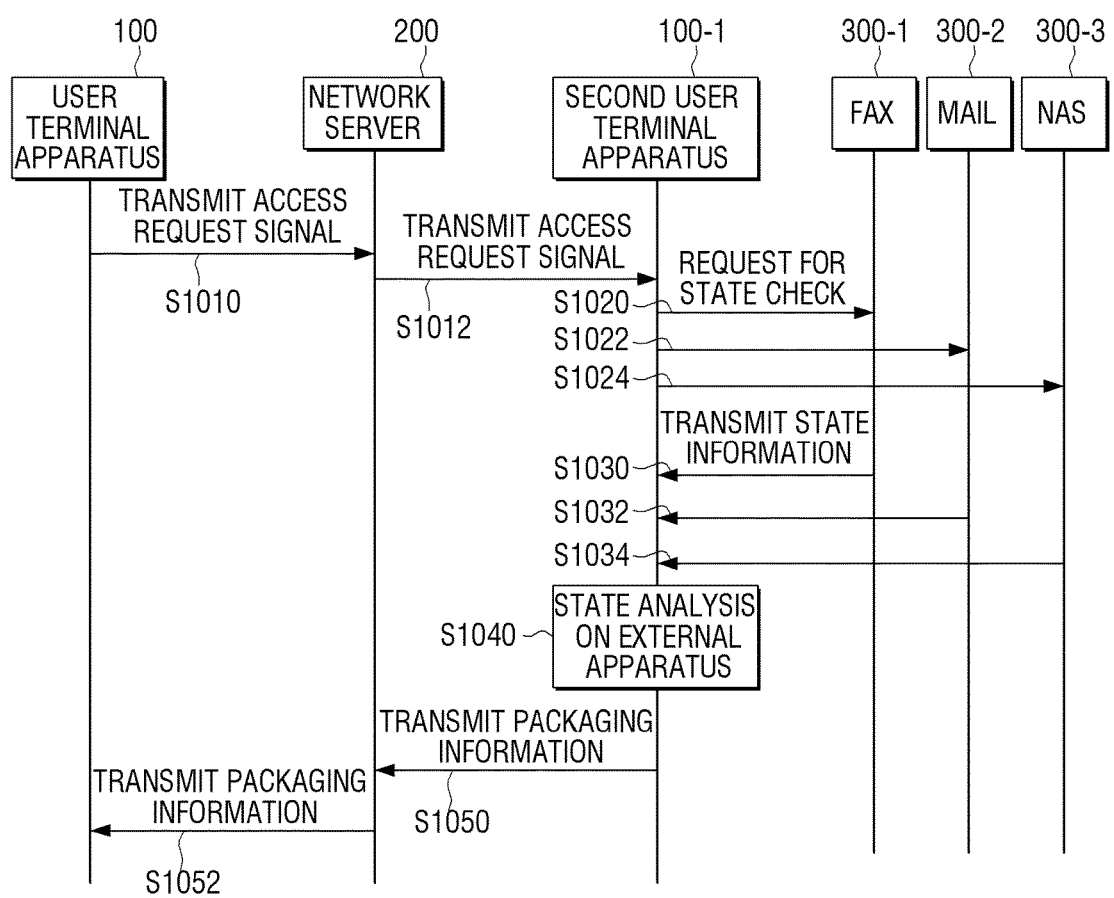
FIG. 10 is a timing view for explaining a communication process between a user terminal apparatus and a second user terminal apparatus in a network shown in FIG. 9.

FIG. 10 is a timing view for explaining a communication process between a user terminal apparatus and a second user terminal apparatus in a network shown in FIG. 9.

With reference to FIG. 10, the first user terminal apparatus 100 transmits an access request signal to the network server 200 (S1010). The network server 200 transmits the corresponding access request signal to the second user terminal apparatus 100-1 (S1012). The process of transmitting the access request signal from the first user terminal apparatus 100 to the second user terminal apparatus 100-1 through the network server 200 has been explained in detail in the above.

The second user terminal apparatus 100-1 may analyze the connection state of the external apparatuses 300-1, 300-2, and 300-3 upon receiving the access request signal. However, alternatively, the second user terminal apparatus 100-1 may transmit, in response to the received access request signal, the packaging information to the network server 200 based on a preset analysis result on the connection state with the external apparatuses 300-1, 300-2, and 300-3. The packaging information transmitted to the network server 200 as aforementioned may be transmitted to the first user terminal apparatus 100.

As illustrated in FIG. 10, the second user terminal apparatus 100-1 transmits a state check request to each of the external apparatuses 300-1, 300-2, and 300-3 (S1020, S1022, S1024). That is, the first user terminal apparatus 100 may check the connection state with each external apparatus 300-1, 300-2, and 300-3 and transmit the state check request to obtain information on the available service in the external apparatus.

When the external apparatuses 300-1, 300-2, 300-3 receive the state check request signal, the external apparatuses 300-1, 300-2, 300-3 transmit their state information to the second user terminal apparatus 100-1 (S1030, S1032, S1034). In FIG. 10, it is illustrated that all the external apparatuses 300-1, 300-2, 300-3 transmit state information thereof, however, an external apparatus that is not connected to the second user terminal apparatus 100-1 or that is not turned on may not transmit the state information thereof.

In this case, when the second user terminal apparatus 100-1 transmits the state check request but does not receive the state information from the external apparatuses 300-1, 300-2, 300-3 within a certain period of time, it is determined that the corresponding external apparatus is not connected to the second user terminal apparatus 100-1. The second user terminal apparatus 100-1 analyzes the received state information (S1040) and extracts available service information of a corresponding external apparatus according to a result of the analysis. Based on the extracted available service information and the state information of the corresponding external apparatus, the packaging information is created.

The second user terminal apparatus 100-1 may transmit the created packaging information to the network server (S1050), and the network server 200 may transmit the packaging information to the first user terminal apparatus 100 (S1052).

Figure 11:
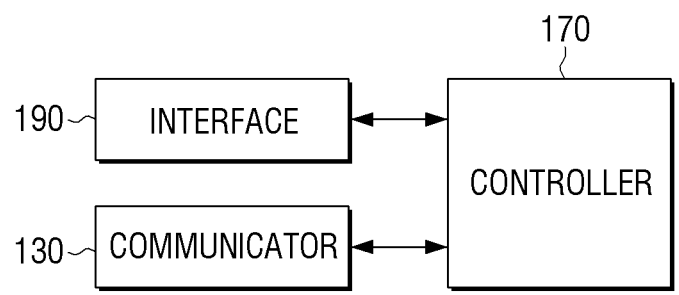
FIG. 11 is a block diagram illustrating a second user terminal apparatus according to an exemplary embodiment.

FIG. 11 is a block diagram illustrating a second user terminal apparatus according to an exemplary embodiment.

With reference to FIG. 11, the second user terminal apparatus 100-1 according to an exemplary embodiment may have the same function as the second user terminal apparatus 100-1 to 100-n in the exemplary embodiments described above. The second user terminal apparatus 100-1 will be described in detail below.

The second user terminal apparatus 100-1 includes a communicator 130, a controller 170, and an interface 190. The communicator 130 receives a service information request from the first user terminal apparatus 100. Here, the service information request is information included in the access request signal transmitted from the first user terminal apparatus 100.

The controller 170 may search for information on the available services from among at least one service of the external apparatus 300 and transmit the searched information to the second user terminal apparatus 100-1 through the communicator 130.

The controller 170 searches for an activated external apparatus from among at least one external apparatus and selects an available function from among functions provided by the searched external apparatus. The controller 170 may package the service information including the identification information of the searched external apparatus and available function information on the selected function and may create packaging information based thereon.

In addition, the controller 170 may control to forward the service information request to a gateway (not shown) that supervises the network of at least one external apparatus. When the service information is created in the gateway, the controller 170 may control to receive the service information and transmit the received service information to the first user terminal apparatus 100. In an exemplary embodiment, the controller 170 may be a central processor unit (CPU).

The interface 190 is connected to at least one external apparatus 300 and performs a function of a communication interface.

Figure 12:
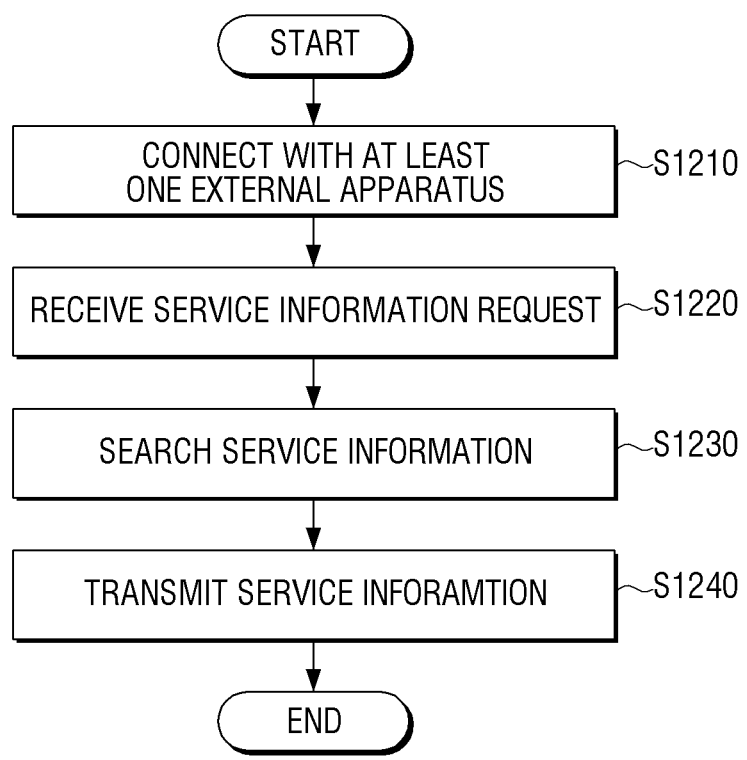
FIG. 12 is a flowchart illustrating a communication method using the second user terminal apparatus shown in FIG. 11.

FIG. 12 is a flowchart illustrating a communication method using the second user terminal apparatus shown in FIG. 11.

With reference to FIG. 12, the communication method using the second user terminal apparatus 100-1 according to an exemplary embodiment includes connecting with the external apparatus (S1210), receiving a service information request (S1220), searching for service information (S1230), and transmitting the searched service information (S1240).

An operation of connecting with the external apparatus 300 includes connecting the second user terminal apparatus 100-1 to at least one external apparatus 300 in a wired or wireless method (S1210). Here, connection between the second user terminal apparatus 100-1 and the external apparatus 300 may be performed in various communication methods according to the external apparatus 300. For example, when the external apparatus 300 supports a wireless LAN, the second user terminal apparatus 100-1 may be connected to the external apparatus through the wireless LAN. Also, when the external apparatus 300 supports Bluetooth communication, the second user terminal apparatus 100-1 and the external apparatus 300 may be connected in Bluetooth communication. Such various types of communication methods may be embodied not only wirelessly but also via wires.

In the operation of receiving the service information request, the second user terminal apparatus 100-1 receives the service information request signal from the network server 200. That is, the second user terminal apparatus 100-1 receives a request for service information available through connected external apparatus 300 (S1220).

In the operation of searching for service information, the second user terminal apparatus 100 checks which communication service is available through the external apparatus 300 connected to the second user terminal apparatus 100-1. That is, the second user terminal apparatus 100-1 requests for service information supported by each of the external apparatuses 300. According to the request signal from the second user terminal apparatus 100-1, the external apparatus 300 may transmit the service information including, for example, types of available services and service characteristics to the second user terminal apparatus 100-1.

In the operation of transmitting service, the second user terminal apparatus 100-1 creates the packaging information including the service information received from the external apparatus 300 and transmits the created packaging information to the network server 200. The network server 200 transmits this to the first user terminal apparatus 100 described in the above exemplary embodiments.

Figure 13:
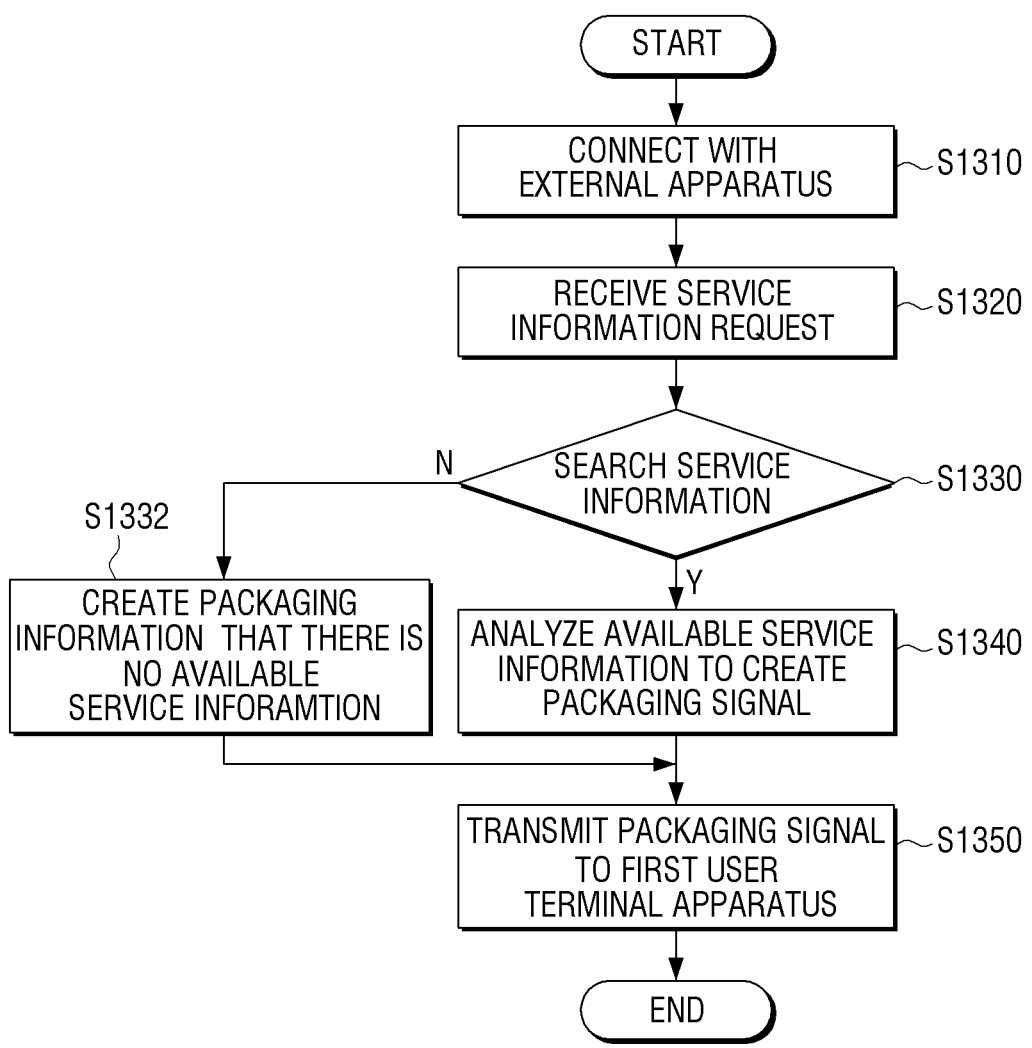
FIG. 13 is a detailed flowchart illustrating a communication method using the second user terminal apparatus shown in FIG. 11.

FIG. 13 is a detailed flowchart illustrating a communication method using the second user terminal apparatus shown in FIG. 11.

With reference to FIG. 13, in the communication method according to an exemplary embodiment, the second user terminal apparatus 100-1 connects with at least one external apparatus 300 (S1310). The second user terminal apparatus 100-1 receives a service information request from the first user terminal apparatus 100 (S1320). According to the received service information request, the second user terminal apparatus 100-1 searches for service information on the available functions of the at least one external apparatus 300 (S1330).

The operation of searching for the service information (S1330) include searching for an activated external apparatus from among the at least one external apparatuses 300, selects an available function from among the functions provided in the searched external apparatus 300, and packages the identification information of the searched external apparatus 300 and the functional information on the selected function, and create the service information.

If there is no available service information ('No' to S1330), the second user terminal apparatus 100-1 creates packaging information including a message that there is no available service information (S1332). When available service information is searched ('Yes' to S1330), the second user terminal apparatus 100-1 analyzes the available service information and creates a packaging signal (S1340). The second user terminal apparatus 100-1 transmits the packaging signal including the created service information to the first user terminal apparatus 100 (S1350).

The operation of transmitting the packaging signal (S1350) includes forwarding the service information request to the gateway supervising the network of at least one external apparatus 300 and transmitting the service information to the second user terminal apparatus 100-1 when the service information is created in the gateway.

In addition, the communication method using the second user terminal apparatus 100-1 according to an exemplary embodiment may be applied to the second user terminal apparatus 100-1 and may be embodied in at least one execution program for executing the communication method using the second user terminal apparatus 100-1.

The program for performing a method according to various exemplary embodiments may be stored in various types of record media.

For example, a code for performing communication methods according to exemplary embodiments may be stored in various types of record medium readable by a terminal such as a random access memory (RAM), a flash memory, a read only memory (ROM), erasable programmable ROM (EPROM), an electronically erasable and programmable ROM (EEPROM), a register, a hard disk, a removable disk, a memory card, a universal serial bus (USB) memory, and a compact disc ROM (CD-ROM).

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. A user terminal apparatus comprising:
a memory comprising computer executable instructions;
a processor configured to read and execute the computer executable instructions;
a display;
an inputter configured to receive a request for accessing another user terminal apparatus, the request comprising an identification (ID) of the another user terminal apparatus;
a communicator configured to, in response to the request being received, transmit an access request to the another user terminal apparatus, and receive service information from the another user terminal apparatus, the service information comprising information on a plurality of communication applications available on the another user terminal apparatus; and
a controller configured to:
control the display to display a user interface (UI) in which the plurality of communication applications available on the another user terminal apparatus is displayed, and
in response to a communication application displayed on the UI being selected by a user input, control the communicator to access the another user terminal apparatus via the selected communication application,
wherein the service information is based on information from at least one external apparatus in an active state among a plurality of external apparatuses connected to the another user terminal apparatus.

2. The user terminal apparatus according to claim 1, wherein a size and a format of the UI are determined based on a number of the plurality of communication applications available on the another user terminal apparatus.

3. The user terminal apparatus according to claim 1, wherein the display displays the UI such that the plurality of communication applications available on the another user terminal apparatus are arranged according to a frequency of use of each communication application.

4. A user terminal apparatus, comprising:
a memory comprising computer executable instructions;
a processor configured to read and execute the computer executable instructions;
a communicator configured to receive a service information request, comprising an identification (ID) of the user terminal apparatus, that requests information on a plurality of communication applications available on the user terminal apparatus, from another user terminal apparatus; and
a controller configured to:
generate service information comprising the information on the plurality of communication applications available on the user terminal apparatus, and
control the communicator to transmit the generated service information to the another user terminal apparatus, in response to the service information request,
wherein the controller is configured to allow the another user terminal apparatus to access the user terminal apparatus through a communication application selected via a user input from a user of the another user terminal apparatus,
wherein the controller is configured to generate the service information based on information from at least one external apparatus in an active state among a plurality of external apparatuses connected to the user terminal apparatus.

5. A communication method for a user terminal apparatus, the method comprising:
- receiving a request for accessing another user terminal apparatus, the request comprising an identification (ID) of the another user terminal apparatus;
- in response to the request being received, transmitting an access request to the another user terminal apparatus, the access request requesting information on a plurality of communication applications available on the another user terminal apparatus; and
- receiving service information from the another user terminal apparatus, the service information comprising the information on the plurality of communication applications available on the another user terminal apparatus;
- controlling a display to display a user interface (UI) in which the plurality of communication applications available on the another user terminal apparatus is displayed; and
- in response to a communication application displayed on the UI being selected by a user input, controlling a communicator to access the another user terminal apparatus via the selected communication application,
- wherein the service information is based on information from at least one external apparatus in an active state among a plurality of external apparatuses connected to the another user terminal apparatus.

6. The communication method according to claim 5, wherein the controlling the display to display the UI comprises controlling a size and format of the UI based on a number of the plurality of communication applications available on the another user terminal apparatus.

7. The communication method according to claim 5, wherein the controlling the display to display the UI comprises controlling the display to display the UI such that the plurality of communication applications available on the another user terminal apparatus are arranged according to a frequency of use of each communication application.

8. The communication method according to claim 5, wherein, in the receiving the request, a telephone number of the another user terminal apparatus is included in the request for accessing, and
the accessing comprises providing a communication route to the another user terminal apparatus using the telephone number and requesting the another user terminal apparatus for the service information through the communication route.

9. A communication method using a user terminal apparatus, the method comprising:
- connecting with at least one external communication apparatus;
- receiving a service information request, comprising an identification (ID) of the user terminal apparatus, from another user terminal apparatus;
- generating service information comprising at least one available communication function of the at least one external communication apparatus according to the service information request, the at least one available communication function being provided to the user terminal apparatus, wherein the generating comprises searching for at least one active external apparatus from among the at least one external communication apparatus and determining the at least one available communication function;
- transmitting the generated service information including identification information of the at least one external communication apparatus connected to the user terminal apparatus and the at least one available communication function being provided to the user terminal apparatus to the another user terminal apparatus; and
- allowing the another user terminal apparatus to access the at least one available communication function of the at least one external communication apparatus provided to the user terminal apparatus, through a communication route corresponding to the ID of the user terminal apparatus.

10. The communication method according to claim 9, wherein the generating comprises searching for an activated external apparatus selected from at least one external apparatus, selecting an available function from among functions provided in the searched external apparatus, and generating the service information based on identification information of the searched external apparatus and information about the at least one available function thereof.

11. The communication method according to claim 9, wherein the transmitting comprises transmitting the service information request to a gateway configured to provide an access to a network of at least one external apparatus; and
receiving the service information from the gateway and transmitting the received service information to the another user terminal apparatus.

12. A user terminal apparatus comprising:
a memory comprising computer executable instructions;
a processor configured to read and execute the computer executable instructions;
a storage configured to store identification information of at least one another user terminal apparatus;
a communicator;
a display configured to display a user interface (UI) that provides service information including at least one communication service available in another user terminal apparatus; and
a controller configured to:
control the UI to display the service information, and
in response to a communication service among the service information through the UI being selected, control the communicator to access an external communication apparatus providing the communication service to the another user terminal apparatus by accessing the another user terminal apparatus using the identification information of the another user terminal apparatus,
wherein the service information is based on information from the external communication apparatus in an active state among a plurality of external communication apparatuses connected to the another user terminal apparatus.

13. The user terminal apparatus according to claim 12, wherein the at least one communication service available in the another user terminal apparatus is obtained based on a connection state between the another user terminal apparatus and an external server, which provides the at least one communication service.

* * * * *